(12) United States Patent
Allwine

(10) Patent No.: US 6,323,641 B1
(45) Date of Patent: Nov. 27, 2001

(54) NON-CONTACTING POSITION SENSOR WITH HELICAL FLUX LINKAGE

(75) Inventor: Elmer Allwine, Santa Clara, CA (US)

(73) Assignee: CTS Corporation, Elkhart, IN (US)

(*) Notice: Subject to any disclaimer, the term of this patent is extended or adjusted under 35 U.S.C. 154(b) by 0 days.

(21) Appl. No.: 09/311,027

(22) Filed: May 13, 1999

(51) Int. Cl.$^7$ .................. G01B 7/30; G01D 5/14
(52) U.S. Cl. .................. 324/207.2; 324/207.22; 324/207.25
(58) Field of Search .............. 324/207.2–207.22, 324/207.25, 173, 174, 251, 252; 123/146.5 A, 406.58, 617; 338/32 R, 32 H

(56) References Cited

U.S. PATENT DOCUMENTS

| | | |
|---|---|---|
| 3,112,464 | 11/1963 | Ratajski et al. . |
| 3,162,804 * | 12/1964 | Parsons ..................... 324/207.2 X |
| 4,142,153 | 2/1979 | Smith . |
| 4,293,837 | 10/1981 | Jaffe et al. . |
| 4,499,420 * | 2/1985 | Shiraki et al. .............. 324/174 |
| 4,562,399 * | 12/1985 | Fisher ........................ 324/174 X |
| 4,570,118 | 2/1986 | Tomczak et al. . |
| 4,726,338 | 2/1988 | Decker et al. . |
| 4,744,343 | 5/1988 | Bisenius et al. . |
| 4,848,298 | 7/1989 | Schleupen . |
| 4,942,394 | 7/1990 | Gasiunas . |
| 5,055,781 | 10/1991 | Sakakibara et al. . |
| 5,059,900 * | 10/1991 | Phillips ........................ 324/173 X |
| 5,097,209 * | 3/1992 | Santos ......................... 324/207.2 |
| 5,115,239 | 5/1992 | Ushiyama . |
| 5,159,268 | 10/1992 | Wu . |
| 5,160,886 * | 11/1992 | Carlen ...................... 324/207.25 X |
| 5,258,735 | 11/1993 | Allwine, Jr. . |
| 5,300,883 * | 4/1994 | Richeson .................... 324/207.22 |
| 5,313,159 | 5/1994 | Allwine, Jr. . |
| 5,528,139 * | 6/1996 | Oudet et al. ............... 324/204.25 X |
| 5,712,561 | 1/1998 | McCurley et al. . |

\* cited by examiner

*Primary Examiner*—Gerard R. Strecker

(57) ABSTRACT

In a non-contacting position sensor (100), an angular positioning of a rotating object, such as a crankshaft, is measured by a Hall effect device (130) that remains stationary in an air gap (158) between a helical flux linkage member (150) and a flux generator (110), both coupled to the rotating object via a shaft (140). The flux generator (110) has a ring magnet (120). The helical flux linkage member (150) varies in thickness from a thin region (154) to a thick region (152). There is a transition region (156) between where the helical flux linkage member is thickest and where it is thinnest. As the shaft (140) rotates, the Hall effect device (130) senses a magnetic field that varies with the thickness of the helical flux linkage member (150), thereby measuring the angular position of the rotating object coupled to the shaft (140).

10 Claims, 3 Drawing Sheets

NON-CONTACTING POSITION SENSOR WITH HELICAL FLUX LINKAGE

FIELD OF THE INVENTION

The present invention relates, in general, to instruments that translate position into an electrical signal and, more specifically, relates to such an instrument making use of the Hall effect.

BACKGROUND OF THE INVENTION

Position sensing is used to gain information about an event or a continuously varying condition. Position sensors known in the industry include resistive contacting networks, inductively coupled ratio sensors, variable reluctance devices, capacitively coupled ratio detectors, optical detectors using the Faraday effect, photo-activated ratio detectors, and electrostatic ratio detectors.

There are a variety of known techniques for angular position sensing. Each of these technologies offers a unique set of advantages and limitations. Of these technologies, magnetic sensing is known to have a unique combination of long component life and excellent contamination resistance. In magnetic sensing, a magnetic field dependent on the angular position is sensed and used to measure the angular position.

In the automotive industry, position sensors are widely used to measure crankshaft position in such applications as engine ignition timing. Examples of patents pertinent to the present invention include:

U.S. Pat. No. 5,712,561 to McCurley et al. for a field position sensor with improved bearing tolerance in a reduced space;

U.S. Pat. No. 3,112,464 to Ratajski et al. for a Hall effect translating device;

U.S. Pat. No. 4,142,153 to Smith for a tachometer measuring speed and direction of shaft rotation with a single sensing element;

U.S. Pat. No. 4,293,837 to Jaffe et al. for a Hall effect potentiometer;

U.S. Pat. No. 4,570,118 to Tomczak et al. for an angular position transducer including permanent magnets and Hall effect device;

U.S. Pat. No. 4,726,338 to Decker for a device for controlling internal combustion engines;

U.S. Pat. No. 4,744,343 to Bisenius for a device for controlling an internal combustion engines;

U.S. Pat. No. 4,848,298 to Schleupen for a device for controlling internal combustion engine;

U.S. Pat. No. 4,942,394 to Gasiunas for a Hall effect encoder apparatus;

U.S. Pat. No. 5,055,781 to Sakakibara et al. for a rotational angle detecting sensor having a plurality of magnetoresistive elements located in a uniform magnetic field;

U.S. Pat. No. 5,115,239 to Ushiyama for a magnetic absolute position encoder with an undulating track;

U.S. Pat. No. 5,159,268 to Wu for a rotational position sensor with a Hall effect device and shaped magnet;

U.S. Pat. No. 5,258,735 to Allwine for a multi-pole composite magnet used in a magnetic encoder; and U.S. Pat. No. 5,313,159 to Allwine for a magnetic encoder with composite magnet.

One problem with current electronic ignition systems is that they use variable reluctance (VR) sensors for measuring crank position. Such sensors magnetically detect variable reluctance patterns symmetrically spaced on a magnetic steel gear circumference. The symmetrical spacing is typically arranged in a 36 symmetrical, geartooth pattern or 10° resolution spacing, which by design provides relative mechanical crankshaft position. However, VR crank sensors are not very reliable when they are used to detect ignition misfire events. The lack of reliability is due to poor signal quality, resolution, and external influences (noise) affecting the sensor signal and thereby inducing false misfire events.

In an effort to override the deficiencies of VR crank sensors in detecting ignition misfire events, filtering or masking schemes have been introduced in the misfire algorithm to attempt to determine between a true and a false misfire event. If these algorithms are incorrectly designed or produced, they may fail to meet the stringent California Air Resource Board emission standards. This failure scenario is potentially a large warranty cost burden to both the consumer and the manufacturer.

The obvious advantage for using VR sensors for the ignition and misfire systems is low cost and high sensor durability. Yet, the limitations of using VR sensors is low voltage output at low cranking speeds, which are generally undetectable by the electronic control module at crank speeds under 30 RPM. Other disadvantages of VR sensors for precision, position measurement applications are poor output signal integrity, accuracy, repeatability, and low resolution.

Thus, there is a need for a magnetic sensor, which can identify cylinder position at or below 15–20 RPM. Such a sensor would improve emission control at engine ignition start, and can also improve the crankshaft position identification response times. Further, there is a need to provide a magnetic sensor that will be conducive to extreme automobile environments and that is adaptable to present electronic control modules. These, and other identified needs, are satisfied by the present invention.

SUMMARY OF THE INVENTION

The present invention provides a non-contacting position sensor capable of high resolution, precise, and absolute angular positioning in static conditions. In accordance with the present invention, the angular position of a rotating object, such as a crankshaft, is measured by a Hall effect device that remains stationary in an air gap between a helical flux linkage member and a flux generator, both coupled to a shaft. The shaft, in turn, is coupled to the rotating object whose angular position is to be measured. The flux generator has a ring magnet. The Hall effect device is aligned with the rotating ring magnet so that the strength of the magnetic field can be sensed at all angular positions. The helical flux linkage member varies in thickness from a thin region to a thick region. There is a transition region between where the helical flux linkage member is thickest and where it is thinnest. As the shaft rotates, the Hall effect device senses a magnetic field that varies with the thickness of the helical flux linkage member. The Hall effect device produces an output waveform proportional to the magnetic field.

There has thus been outlined, rather broadly, the more important features of the invention so that the detailed description thereof may be better understood. Those skilled in the art will appreciate that the preferred embodiment may readily be used as a basis for designing other structures, methods and systems for carrying out the several purposes of the present invention. It is important, therefore, that the claims are regarded as including such equivalent constructions since they do not depart from the spirit and scope of the present invention.

DESCRIPTION OF THE DRAWINGS

The preferred embodiments of the present invention will hereinafter be described in conjunction with the appended drawings, where like designations denote like elements, and.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENTS

Figure 1:
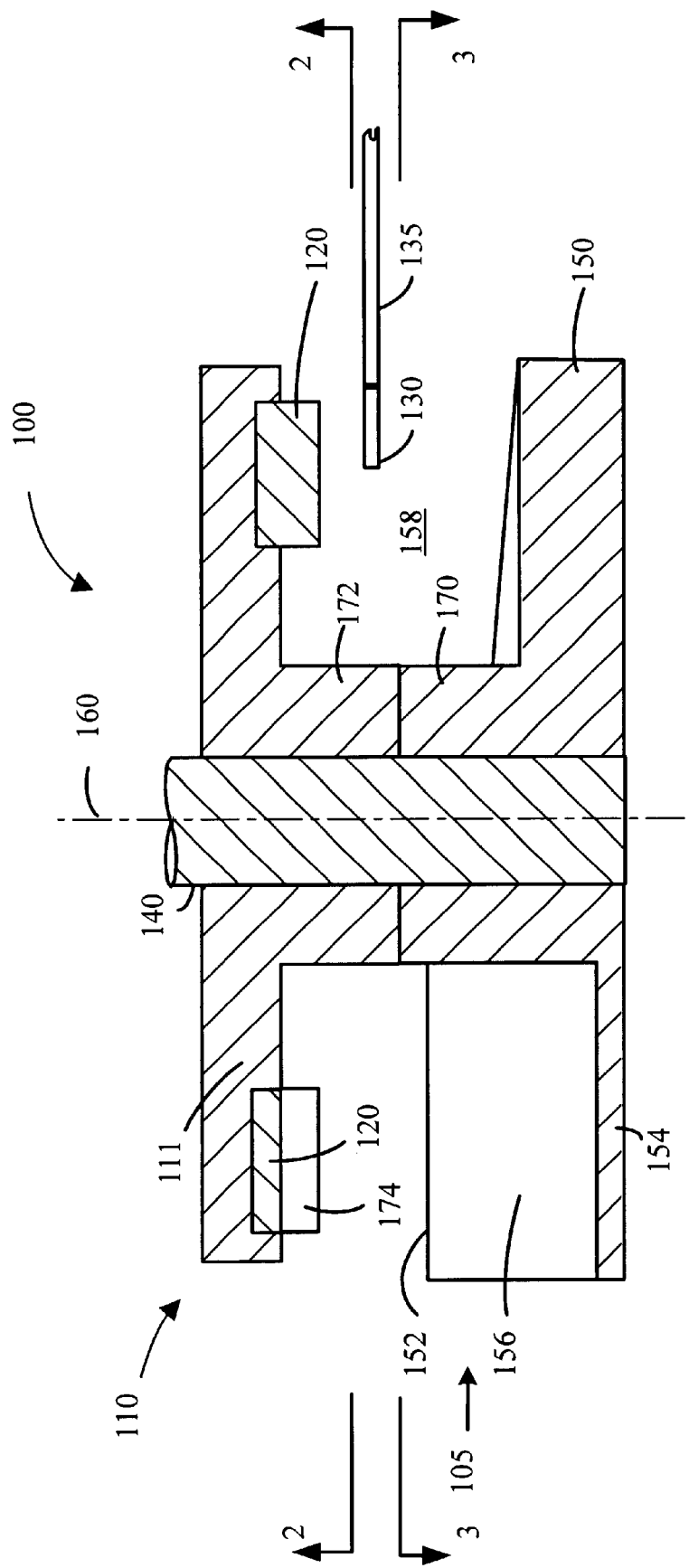
FIG. 1 is a cross sectional view of a non-contacting position sensor in accordance with the present invention.

FIG. 1 is a cross sectional view of a non-contacting position sensor 100 in accordance with the present invention. Position sensor 100 includes a pole assembly 105 comprised of a flux generator assembly 110, a helical flux linkage member 150, and a bottom hub 170. Helical flux linkage member 150 is coupled to bottom hub 170, which has shaft hole therethrough and is coupled to a shaft 140. Flux generator assembly 110 is made up of a disc 111, a ring magnet 120 attached to disc 111, an upper hub 172 coupling disc 111 to shaft 140. FIG. 1 shows ring magnet 120 partially embedded in disc 111. In an alternative embodiment, ring magnet 120 can be completely embedded in disc 111. In another alternative embodiment, the bottom surface of disc 111 is a flush surface, to which ring magnet 120 is attached. An air gap 158 is shown between flux generator assembly 110 and helical flux linkage member 150. Shaft 140 is adapted to be connected to another rotating object (not shown) such as, for example, a motor shaft, a crankshaft, or a throttle body on a fuel injection system. Shaft 140 rotates about an axis of rotation 160 at the same rate as the other rotating object. Disc 111, helical flux linkage member 150, bottom hub 170, upper hub 172 and shaft 140 are magnetically permeable and are preferably formed out of a conventional low carbon steel, such as 1018 cold rolled or Ancor steel. Alternatively, disc 111, helical flux linkage member 150, bottom hub 170, and upper hub 172 can be molded out of powdered metal. Helical flux linkage member 150 has a uniform width. The thickness of helical flux linkage member 150 varies gradually from a thin region 154 to a thick region 152 and the drops abruptly over a transition region 156 back to thin region 154.

Position sensor 100 also includes a Hall effect device 130 attached to a printed circuit board 135. Hall effect device 130 remains stationary in air gap 158 while pole assembly 105 turns around axis of rotation 160. Hall effect device 130 is preferably a conventional Hall effect sensor, such as a Siemens model KSY144. Printed circuit board 135 connects Hall effect device 130 to external circuitry (not shown). Hall effect device 130 provides an output signal that the external circuitry receives for processing.

Figure 2:
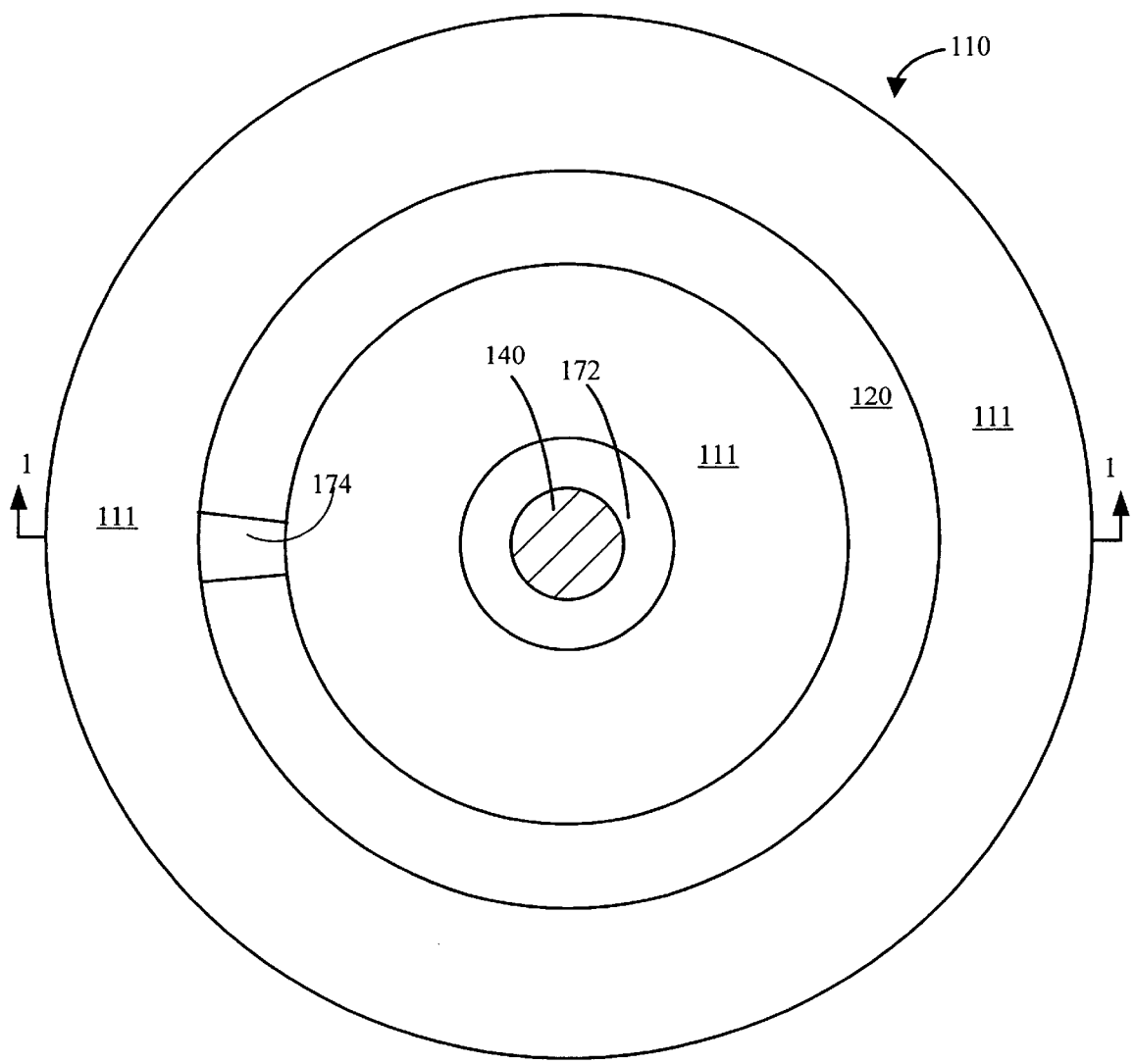
FIG. 2 is a bottom view of a portion of the non-contacting position sensor of FIG. 1.

FIG. 2 is a bottom view of a top portion of position sensor 100 shown in FIG. 1. More particularly, FIG. 2 shows flux generator assembly 110 comprised of disc 111, ring magnet 120, and upper hub 172. The inner diameter of disc 111 is coupled to upper hub 172, which in turn is coupled to shaft 140. Ring magnet 120 is generally a ring with a slot 174 therein. Further, ring magnet 120 has a substantially uniform thickness and width. Slot 174 in ring magnet 120 is positioned over transition region 156 of helical flux linkage member 150. In other words, slot 174 in ring shaped magnet 120 is positioned proximate and straddling thick region 152 and thin region 154. Slot 174 in ring magnet 120 serves to improve the peak electrical signal transition from a high level to a low level. It should be noted that, although preferred, slot 174 is an optional feature in ring magnet 120. Ring magnet 120 is preferably made out of a conventional magnetic material such as barium ferrite. Magnet 120 is held to disc 111 by magnetic attraction or may be held with an adhesive.

Figure 3:
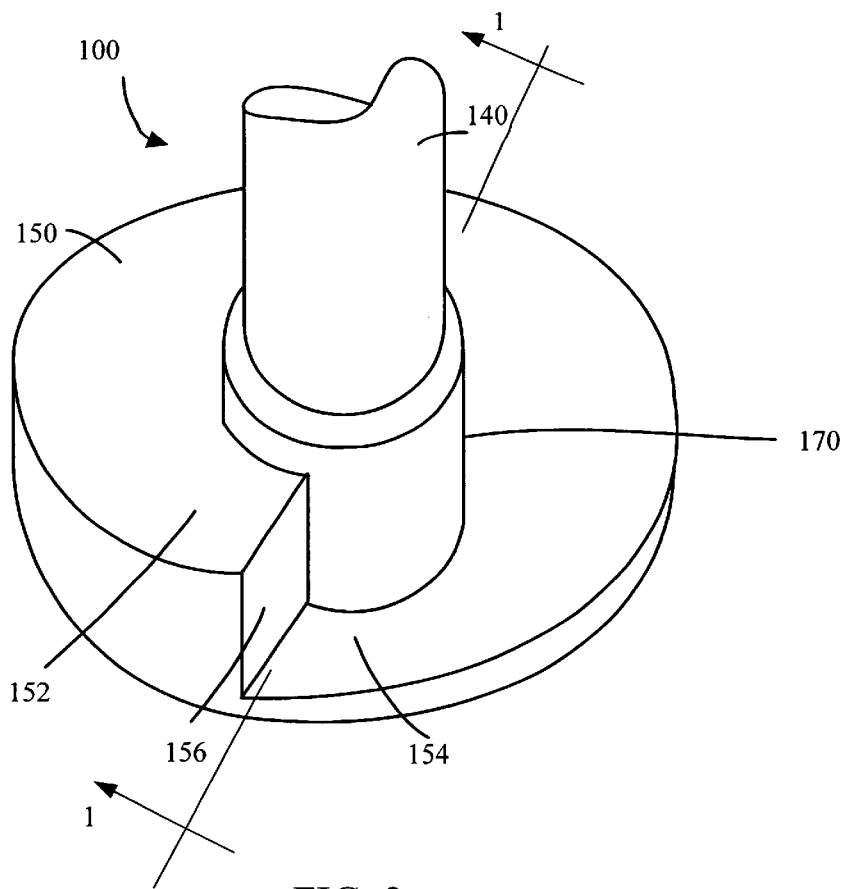
FIG. 3 is an isometric view of another portion of the non-contacting position sensor of FIG. 1.

Referring now to FIG. 3, an isometric view of helical flux linkage member 150 is shown. Shaft 140 is coupled to both bottom hub 170 and helical flux linkage member 150. Helical flux linkage member 150 varies in thickness gradually from a thin region 154 to thick region 152, and then sharply drops off in thickness at region 156, back to thin region 154. Thus, the thickness of helical flux linkage member 150 under Hall effect device 130 varies as pole assembly 105 (FIG. 1) rotates. By sensing the output of Hall effect device 130, the angular position of pole assembly 105 can be measured to an accuracy of approximately 0.1 degree (°).

OPERATION OF THE PREFERRED EMBODIMENT

The operation of the non-contacting position sensor 100 is as follows. Referring back to FIG. 1, as shaft 140 rotates, ring magnet 120 will rotate relative to Hall effect device 130. A closed magnetic path exists when the magnetic flux generated by ring magnet 120 is confined within a high permeability material such as found in pole assembly 105. Specifically, the magnetic flux primarily flows from ring magnet 120, through disc 111, upper hub 172, lower hub 170, helical flux linkage member 150, across air gap 158, and back to ring magnet 120, thereby completing the flux path. Upper hub 172 and lower hub 170 form a primary flux return path that provides a short flux return path and keeps the magnetic flux concentrated at a higher level.

As pole assembly 105 turns, the thickness of helical flux linkage member 150 under Hall effect device 130 varies. Consequently, the thickness of air gap 158 varies. If pole assembly 105 rotates in one direction so that the thickness of air gap 158 near Hall effect device 130 gradually decreases, the magnetic flux adjacent Hall effect device 130 becomes more concentrated. Therefore, Hall effect device 130 senses an increasingly strong magnetic field. When thick region 152 is directly under Hall effect device 130, the thickness of air gap 158 reaches a minimum and Hall effect device senses a maximum magnetic field. When transition region 156 in helical flux linkage member 150 rotates to a position substantially directly under Hall effect device 130, the thickness of air gap 158 adjacent Hall effect device 130 increases abruptly. At this moment, slot 174 in ring magnet 120 is substantially directly above Hall effect device 130. Therefore, Hall effect device 130 senses a minimum magnetic field. The minimum magnetic field in air gap 158 depends on the configuration and magnetic characteristics of pole assembly 105. Slot 174 in ring magnet 120 serves to improve the peak electrical signal transition from a high level to a low level.

Hall effect device 130 sends out an output signal in accordance with the sensed magnetic field. Therefore, the angular position of pole assembly 105 can be measured by measuring the output signal of Hall effect device 130.

Figure 4:
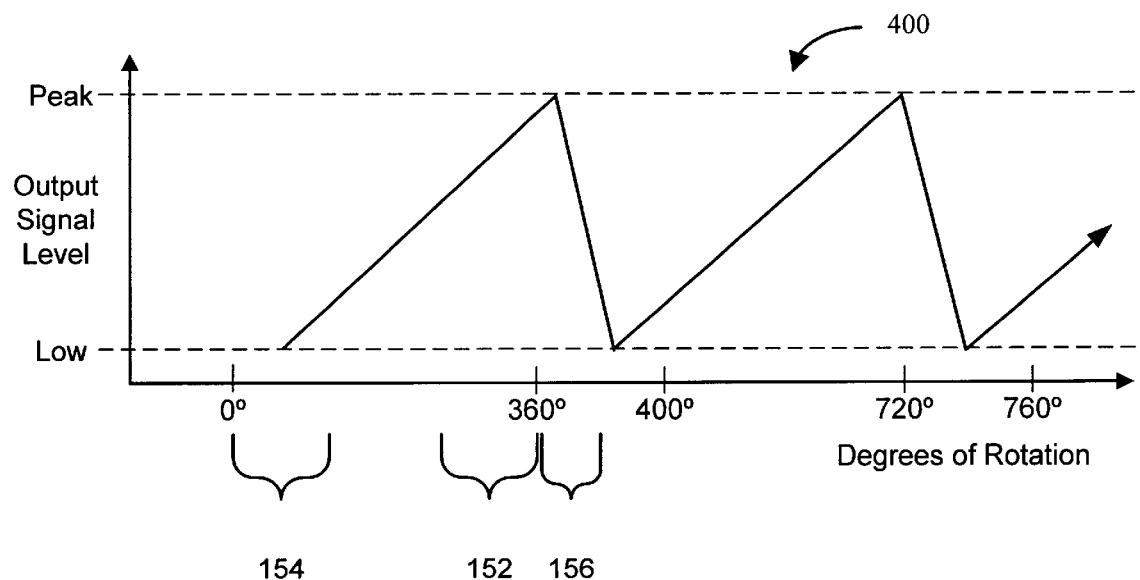
FIG. 4 is a graph illustrating a relation between an output signal of the non-contacting position sensor of FIG. 1 and an angular position to be measured in accordance with the present invention.

Referring now to FIG. 4, a graph 400 of output signal level versus the angular position of pole assembly 105 is illustrated. By way of example, the output signal is a voltage signal substantially proportional to the magnetic field sensed by Hall effect device 130. However, it should be understood that this is not intended as a limitation of the present invention. Depending on the circuitry coupled to Hall effect device 130, the output signal can be either a voltage signal or a current signal and can have any kind of monotonic relation with the magnetic field sensed by Hall effect device 130. When plotted as a function of the angular position, the output signal of position sensor 100 has a generally sawtooth shape. Those skilled in the art will recognize that the output from position sensor 100 is usually connected to conventional signal processing electronics for amplification, filtering, etc.

When thin region 154 of helical flux linkage member 150 is directly below the Hall effect device, the angular position is defined as 0°. If pole assembly 105 starts to rotate from 0°, the voltage rises generally linearly as the thickness of helical flux linkage member 150 under Hall effect device 130 increases. As pole assembly 105 continues to spin past thickest region 152 of helical flux linkage member 150, there is a transition region 156 to thin region 154 of helical flux linkage member 150. The drop-off in thickness and slot 174 in ring magnet 120 result in a drop-off in voltage signal. As the thickness of helical flux linkage member 150 starts to increase again, the cycle repeats itself for the next rotation from 360° to 720°, then again from 720° to 1080°, and so on. In this way, the waveform output shown in graph 400 is produced, with the voltage increasing from a low to a peak for each 360° crank rotation, and with a fast fall transition at each revolution cycle of the crank wheel.

REMARKS ABOUT THE PREFERRED EMBODIMENTS

Those skilled in the art of position sensors, and more particularly the art of designing non-contacting position sensors, will realize many advantages from using the preferred embodiment. In particular, the non-contacting position sensor allows the continuous position sensing of a continuously rotating object using a variable magnetic field. It is understood that there are magnetic losses in any magnetic path from fringing flux and other loss sources. The rotation of the magnet simultaneously with the pole assembly allows for the elimination of eddy currents and their unwanted effects.

VARIATIONS OF THE PREFERRED EMBODIMENTS

One of the ordinary skills in the art of making position sensors will realize that there are many different ways of accomplishing the preferred embodiment. For example, the pole pieces could be made out of any magnetically permeable material, such as cast iron. Similarly, even though the embodiment discusses the use of a Barium Ferrite magnet, those skilled in the art of magnet design will understand that most any magnet could work, like a Samarium Cobalt magnet. Additionally, while the sensor shown in the preferred embodiment is a Hall effect sensor, other sensors could be utilized such as magnetoresistive sensors or other types of magnetic sensors. Also, even though one Hall effect sensor is illustrated, two or more Hall effect sensors could be used.

Although ring magnet 120 was shown as a ring, it is contemplated that ring magnet 120 could be a flat disc. Ring magnet 120 could be completely recessed into disc 111 in order to help hold it in place as it is subjected to centrifugal forces during rotation. Ring magnet 120 can also be attached to the bottom surface of disc 111. Such an arrangement is usually suitable in the position sensing of low speed rotation applications.

Even though helical flux linkage member 150 was shown as having a continuous inclining ramp from thick region 152 to thin region 154, it is contemplated that most any shape could work, like a series of steps placed on pole piece 150 to produce a step-like output signal.

Although the illustrated embodiment teaches the use of upper hub 172 and lower hub 170, this is not intended as a limitation of the present invention. For example, it is contemplated to eliminate the hubs and use a solid shaft integral with disc 111 and flux linkage member 150.

While the invention has been particularly shown and described with reference to preferred embodiments thereof, it will be understood by those skilled in the art that various changes in form and details may be made therein without departing from the spirit and scope of the invention.

What is claimed is:
1. A non-contacting position sensor, comprising:
   a) a shaft;
   b) a flux generator, including:
      i) a disc coupled to said shaft; and
      ii) a magnet attached to said disc;
   c) a helical flux linkage member having a peripheral surface located at a constant diameter from said shaft and coupled to said shaft, and having a tapered thickness variation substantially perpendicular to said shaft, said thickness variation gradually increasing from a thin region to a thick region, and decreasing abruptly from said thick region to said thin region, wherein this abrupt decrease forms a vertical plane in parallel with said shaft; and
   d) a magnetic field sensor positioned between said flux generator and said helical flux linkage member, and sensing a varying magnetic field as said shaft rotates.

2. The non-contacting position sensor of claim 1, wherein said magnet in said flux generator includes a ring shaped magnet with substantially uniform thickness and substantially uniform width.

3. The non-contacting position sensor of claim 2, wherein said ring shaped magnet has a slot positioned straddling the thick region and the thin region in said helical flux linkage member.

4. The non-contacting position sensor of claim 1, wherein said magnet is polarized in a direction substantially parallel to said shaft.

5. The non-contacting position sensor of claim 1, wherein said magnetic field sensor includes a Hall effect device.

6. The non-contacting position sensor of claim 1, wherein the thickness variation of said helical flux linkage member increases gradually from a minimum thickness in the thin region to a maximum thickness in the thick region and decreases abruptly to the minimum thickness over a transition region in said helical flux linkage member.

7. The non-contacting position sensor of claim 1, further comprising a hub made of a magnetic permeable material, said hub coupling said helical flux linkage member to said shaft.

8. The non-contacting position sensor of claim 1, further comprising a hub made of a magnetic permeable material, said hub coupling said disc to said shaft.

9. The non-contacting position sensor of claim 1, wherein said magnet is embedded, at least partially, in said disc.

10. A non-contacting position sensor, comprising:
   a) a magnetic field generator, rotatable around an axis of rotation, said magnetic field generator including a disc rotatable about the axis of rotation, and a permanent magnet mounted to said disc, wherein said permanent magnet includes a ring shaped magnet with substantially uniform thickness and substantially uniform width;
   b) a flux linkage assembly having a substantially circular and planar shape, and having a thickness varying in a plane substantially perpendicular to said axis of rotation, said flux linkage assembly rotatable around the axis of rotation and coaxial with the magnetic field generator, defining an air gap adjacent to said magnetic field generator, said flux linkage assembly further including a helical flux linkage member having a varying thickness increasing gradually from a minimum thickness in a thin region to a maximum thickness in a thick region and decreasing abruptly to the minimum thickness over a transition region, wherein said ring shaped magnet has a slot positioned over the transition region in said helical flux linkage member; and
   c) a magnetic field sensor positioned in the air gap, said magnetic field sensor generating an output signal in accordance with a relative angular position of said flux linkage assembly with respect to said magnetic sensor.

* * * * *